March 24, 1959 L. E. SPROUSE 2,878,989
MULTIPLE LENGTH SPIRAL BLADED BLOWER WHEEL
Filed Jan. 31, 1957
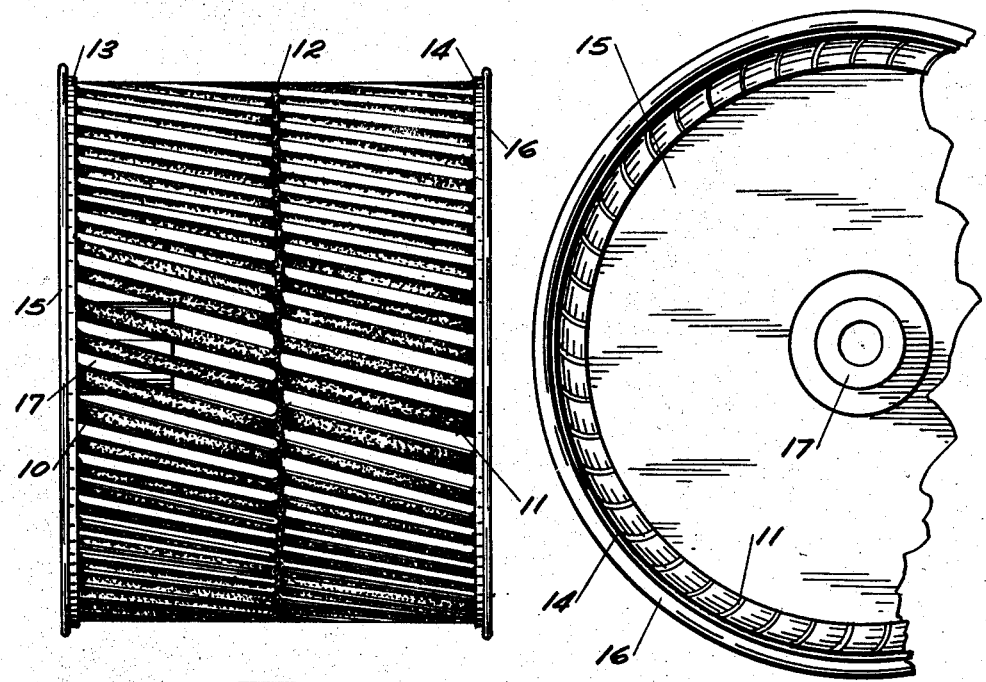
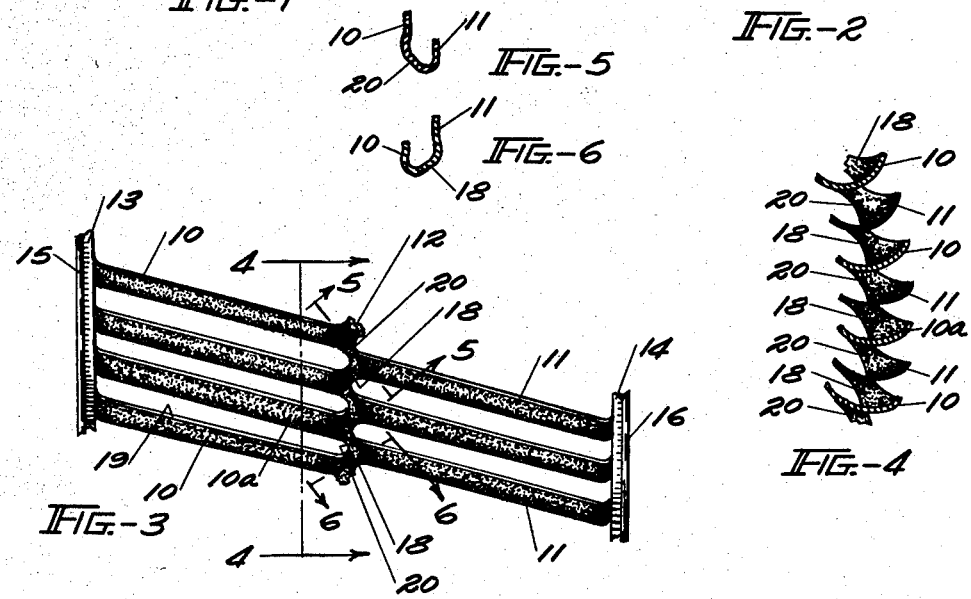
INVENTOR–
LOWELL E. SPROUSE
BY Herbert Q. Minturn
ATTORNEY

United States Patent Office 2,878,989
Patented Mar. 24, 1959

2,878,989

MULTIPLE LENGTH SPIRAL BLADED BLOWER WHEEL

Lowell E. Sprouse, Columbus, Ind., assignor to Vernco Corporation, Columbus, Ind., a corporation of Indiana Application January 31, 1957, Serial No. 637,562

3 Claims. (Cl. 230—134)

This invention relates to a blower wheel of the drum type wherein air is taken in centrally of the wheel and discharged through a multiple number of blades spaced circumferentially at equal distances from the axis of rotation of the wheel. This particular invention involves the use of spiral blading wherein a plurality of lengths of blades are positioned around the circumference of the wheel, and are supported one group of blades with another group of blades by a circumferential, zig-zag land wherein the land is in such a form by reason of angular sections thereof to rigidly support the adjacent ends of blades all without having to employ a rib, or separate member therearound. Furthermore, by reason of the peculiar land interconnections between blade ends, the blades may be made of maximum lengths whereby the adjacent ends of the blades terminate substantially on a common circumferential line around the wheel.

An important advantage of the invention lies in the fact that not only can spiral blades be employed for a uniform delivery of air, and with extremely low noise level, but also the metal thickness may be reduced to thicknesses far below those now commonly employed in blower wheels, not only permitting a reduction in weight, but also permitting easier formation, less cost of upkeep of dies, and also the permission of use of metals such as aluminum without distortion in actual usage.

These and many other objects and advantages of the invention will become apparent to those versed in the art, in view of the following description which is made in reference to the accompanying drawing, in which Fig. 1 is a view in side elevation of a blower wheel construction embodying the invention;

Fig. 2 is a view on a slightly enlarged scale in end elevation;

Fig. 3 is a view in side elevation on an enlarged scale of a short circumferential length of the blading;

Fig. 4 is a view in section on the line 4—4 in Fig. 3;

Fig. 5 is a detail in section on the line 5—5 in Fig. 3; and

Fig. 6 is a detail in secton on the line 6—6 in Fig. 3.

The blower wheel construction in general comprises a plurality of blades 10 spaced circumferentially apart around the wheel and a second set of blades 11 likewise spaced circumferentially around the wheel, the blades 10 and 11 being staggered one in relation to the other around the wheel, and the opposing ends of the blades 10 and 11 come into a central land 12 as a supporting means for those opposing ends of the blades. The outer ends of the blades 10 and 11 are integrally formed with lands 13 and 14 respectively, the land 13 being interengaged with a back plate 15 peripherally therearound, and the land 14 being interengaged with a ring 16 formed thereover, all in the usual and well known manner as is well known to those versed in the art. The blades 10 and 11 and the land 12 are integrally united. The blower wheel is driven by any suitable means such as a shaft (not shown) fitting within the hub 17 fixed centrally of the back plate 15.

In the form herein shown, the blades 10 in the one group are spaced at their opposing ends substantially half way between the blades 11 in the second group.

The land 12 is diagonally corrugated in effect throughout its circumferential length.

Referring to Fig. 3, the inner end or tongue 18 of a blade 10 continues diagonally across the land 12 from an upper half portion of the blade 10 (the term "upper" is employed in reference to the view 3, and meaning that portion adjacent the outermost lip 19 of the blade) to merge integrally into the lower half portion of the blade 11.

There is a tongue 20 integrally extending from the blade 11, that is the upper or outermost half of that blade 11, diagonally over to the lower half of the next adjacent blade 10a.

Thus the land 12 consists of these tongues 18 and 20 which diagonally extend from each side of a center line between the ends of the blades 10 and 11 to go from an upper portion of a blade on one side of that line to a lower portion of an end of the next blade on the other side of that line. In so doing, the tongues 18 and 20 will assume approximately the positions as indicated in Figs. 5 and 6 deviating in positions but slightly from a plane which would be normal to the axis of rotation of the wheel. In such an arrangement, the tongues 18 and 20 serve in effect as a truss formation resisting the bending of the land 12 in general from its originally formed circumferential pattern so that the opposing ends of the blades 10 and 11 are rigidly held against flying out of their circumferential travel so that all points along the lips of the blades 10 and 11 on the delivering edge will be maintained at fixed, common radii from the axis of rotation.

By reason of this structure thus far described, the maximum lengths of blades 10 and 11 may be employed wherein the over-all, total length of a blade 10 and a blade 11 will be substantially equal to the distance between the lands 13 and 14 diagonally across therebetween in parallel relation to the edges of the blades. At the same time, the inner ends of the blades 10 and 11 are rigidly supported and the intervening tongues 18 and 20 do not detract in any way from the delivery of air, but to the contrary continue in effect the air moving surfaces of the two blades across the intervening connection therebetween.

Therefore it is to be seen that I have provided a spiral bladed blower wheel wherein multiple lengths of quite thin metal may be employed, and wherein the blades are rigidly supported one from another between the different series of blades, and while I have herein shown and described the invention in the one particular form, it is obvious that structural changes may be employed without departing from the spirit of the invention, and I therefore do not desire to be limited to that precise form beyond the limitations which may be imposed by the following claims.

I claim:

1. A blower wheel of the cylindrical drum type comprising an integral construction of two axially spaced apart, circumferential, end lands; one set of spaced apart blades having outer ends integrally joined with one of said lands and extending therefrom in parallel, diagonal directions toward the second land; a second set of spaced apart blades having outer ends integrally joined with the second land and extending therefrom in parallel, diagonal directions toward the first land; the blades in the second set being spaced to have the lines of their leading and trailing edges midway between like lines of the blades in said one set, all of said edges being approximately parallel one with the other whereby the blades of both sets are in discontinuous spiral arrangement between said lands; a tongue leading integrally from substantially the leading half of each blade inner end portion in said one set diagonally across in a leading direction integrally merging into substantially the trailing half of the inner end portion respectively of the circumferentially next blades in a leading direction of the second set of blades; and a tongue leading integrally in a leading direction diagonally from the substantially leading half of each of the inner end portions of the trailing blades following said next blades in the second set and merging into substantially the lower half of the inner end portion of the blade from which the first said tongue leads and each blade thereafter following in the first set; said tongues zig-zagging in alternate reversing directions between their inner ends of the blades of the two sets and forming the sole support therebetween.

2. The structure of claim 1 in which the combined lengths of two blades, one from each set, are substantially equal to the diagonal distance between said two lands measured in parallel relation to the blade edges.

3. The structure of claim 1 in which surfaces of said tongues are tilted in said diagonal directions from and across a plane between the inner ends of the blades of both sets, normal to the rotation axis of the wheel.

References Cited in the file of this patent

UNITED STATES PATENTS

| | | |
|---|---|---|
| 272,595 | Smith | Feb. 20, 1883 |
| 1,075,120 | Rogers | Oct. 5, 1913 |
| 1,156,118 | Warg | Oct. 12, 1915 |
| 2,315,407 | Evans | Mar. 30, 1943 |
| 2,724,547 | Abbott et al. | Nov. 22, 1955 |

FOREIGN PATENTS

| | | |
|---|---|---|
| 14,103 | Great Britain | of 1913 |
| 212,108 | Germany | July 23, 1909 |